Patented Jan. 21, 1936

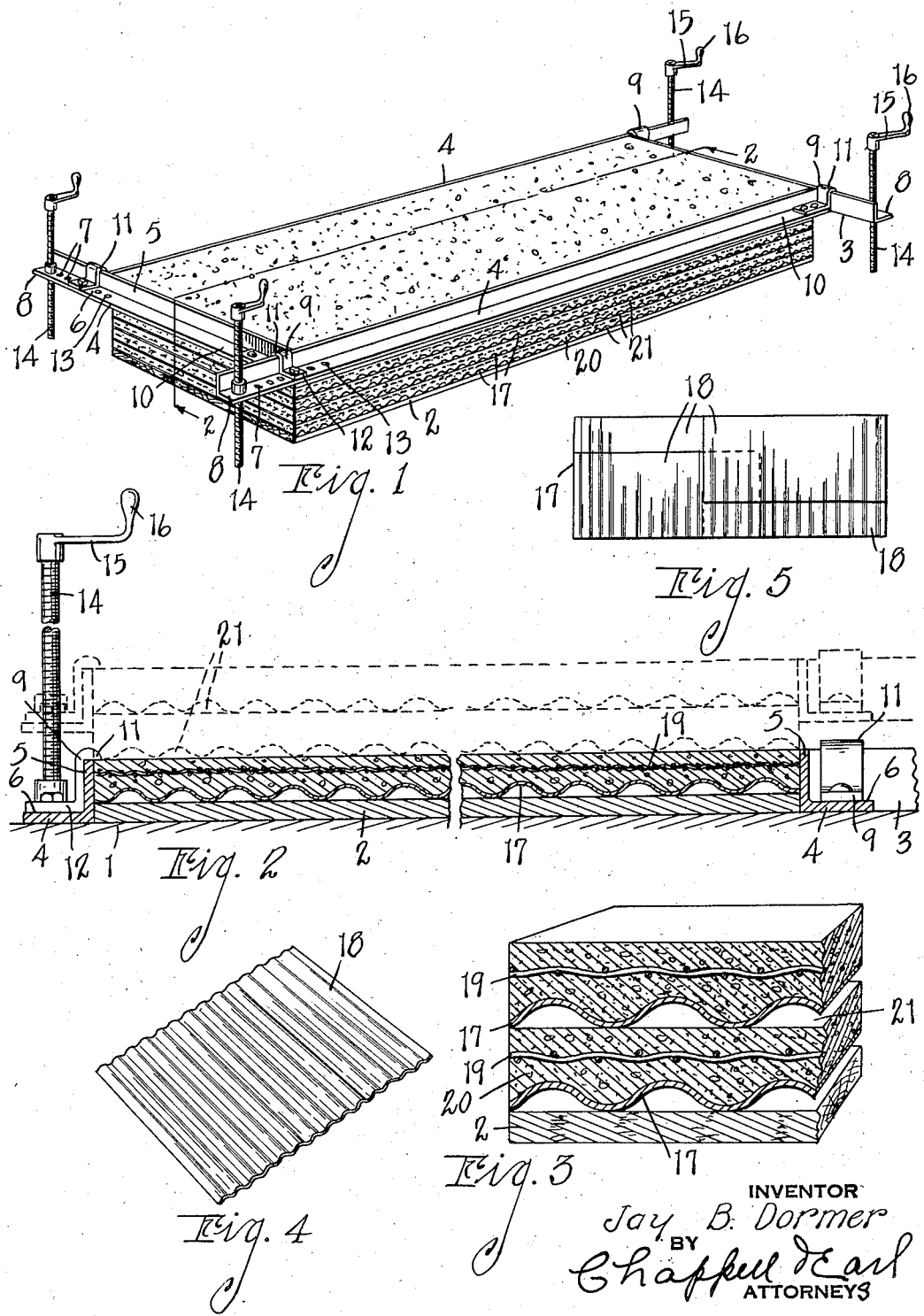
Jan. 21, 1936. J. B. DORMER 2,028,443
MOLD APPARATUS
Filed Aug. 11, 1933

2,028,443

UNITED STATES PATENT OFFICE 2,028,443

MOLD APPARATUS

Jay B. Dormer, St. Joseph, Mich.

Application August 11, 1933, Serial No. 684,668

4 Claims. (Cl. 25—121)

The main objects of this invention are:

First, to provide an improved method of molding slabs in a vertical series by means of a single vertically adjustable mold which is open at the top and bottom.

Second, to provide a method of this character including the step of using corrugated separators on the flat tops of the partially hardened previously formed slabs for ventilation thereof, the separators constituting mold bottom members.

Third, to provide a mold of improved apparatus for carrying my method into effect, the mold being free for vertical adjustment and being adjustable in length and width.

Fourth, to provide a mold bottom member consisting of a plurality of corrugated sections arranged in overlapping relation, with the corrugations of the overlapping parts in registration, for transverse and longitudinal adjustment.

Fifth, to provide a mold apparatus of this kind which is simple and economical in its parts and very efficient and effective in operation.

Objects relating to details and economies of my invention will appear from the description to follow. The invention is defined and pointed out in the claims.

A structure which is a preferred embodiment of my invention is illustrated in the accompanying drawing, in which:

Fig. 1 is a perspective view of my apparatus in operation.

Fig. 2 is an enlarged fragmentary sectional view on a line corresponding of Fig. 1.

Fig. 3 is an enlarged fragmentary perspective sectional view.

Fig. 4 is a perspective view of a corrugated separator section.

Fig. 5 is a plan view of a separating sheet or bottom member.

In the embodiment of my invention illustrated by the drawing, numeral 1 represents a suitable supporting surface on which is mounted the pallet 2 which corresponds in size to the sides of the slabs to be formed thereabove. The mold 3 is open at the bottom and at the top and comprises four side members 4 of angle section arranged in rectangular end-to-side relation with their side walls 5 vertical and their flanges 6 projecting outwardly from the bottom edge of the side walls, the flanges having a series of holes 7 near the outer ends 8 of the side members.

A bracket 9 is secured to the flange at one end 10 of each side member, the brackets having loops or loop-like offsets 11 of inverted U-shape receiving the side wall of the adjacent side member and terminating in an end portion 12 overlapping the flange of such adjacent side member. The end portions of the brackets are provided with holes 13 for registration with holes in the flange, bolts being provided for connecting the parts in their adjusted positions. With the parts thus arranged, the size of a mold may be adjusted as desired within the scope of the mold.

A vertical supporting screw 14 is threaded to the flange near the outer end of each side member and has a crank 15 terminating in a handle 16 at its upper end for adjusting the screw to change the vertical position of the mold as the stack of slabs progresses.

The mold bottom member or separating sheet 17 consists of a plurality of corrugated sections 18, preferably four, arranged in overlapping relation as shown by Fig. 5 with the corrugations of the overlapping parts in registration so as to preserve the corrugated continuity of the sheet and permit adjustment as to size.

The pallet 2 is first placed upon a suitable support 1 with the side walls 4 of the mold 3 engaging its side edges, as illustrated by Fig. 2. A corrugated sheet 17 is then placed on the pallet 2 within the side walls of the mold. The reinforce 19 is then positioned and the mold filled with a cementitious mixture. The top of the mixture is allowed to harden or set to such an extent that another corrugated separating sheet 17 may be laid upon the molded slab 20 and the mold raised a suitable distance by means of screws 14 to permit the forming of a second slab upon the separating sheet.

The second slab is then molded, the operation being repeated until the stack contains the desired number of slabs, the mold being vertically adjusted for each successive slab and the corrugated separating sheets being arranged between the successive slabs. The tops of the partially hardened slabs are open to the atmosphere through the channels 21 provided thereabove by the corrugations in the separating sheet, the bottom of the next higher slab being molded in the shape of the corrugated sheet. The transverse channels permit circulation of air above the slabs and thereby facilitate curing of the cementitious mixture.

My method permits the molding of a number of cementitious parts in a comparatively small area, thus obviating the necessity for a large plant or yard. The mold and separating sheets are readily adjustable to form slabs of different sizes.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. A mold comprising in combination side members of angle section arranged in rectangular end-to-side relation with their side walls vertical and their flanges projecting outwardly from the bottom edge of the side walls, the flanges having a series of holes near the outer ends of the side members, a bracket on the flange near the inner end of each side member and having a loop of inverted U-shape receiving the side wall of the adjacent side member and terminating in an end portion overlapping the flange of said adjacent side member and provided with a hole for registration with a selected one of the holes in the flange, a bolt arranged through each pair of registering holes for connecting the end portion of each bracket to its flange, a vertical supporting screw threaded to the flange near the outer end of each side member and having a handle at its upper end for adjusting the screw to change the vertical position of the mold, and a longitudinally and transversely adjustable mold bottom member consisting of four corrugated sections arranged in overlapping relation with the corrugations of the overlapping parts in registration.

2. A mold comprising in combination side members of angle section arranged in rectangular end-to-side relation with their side walls vertical and their flanges projecting outwardly from the bottom edge of the side walls, the flanges having a series of holes near the outer ends of the side members, a bracket on the flange near the inner end of each side member and having a loop of inverted U-shape receiving the side wall of the adjacent side member and terminating in an end portion overlapping the flange of said adjacent side member and provided with a hole for registration with a selected one of the holes in the flange, a bolt arranged through each pair of registering holes for connecting the end portion of each bracket to its flange, a vertical supporting screw threaded to the outer end of each side member and having a handle at its upper end for adjusting the screw to change the vertical position of the mold, and a longitudinally and transversely adjustable mold bottom member adapted to rest directly on a partially cured slab and consisting of corrugated sections arranged in overlapping relation, the corrugations providing ventilating channels for the partially cured slab.

3. A mold comprising in combination side members of angle section arranged in rectangular end-to-side relation, a bracket on the inner end of each side member and having a loop of inverted U-shape receiving the side wall of the adjacent side member and terminating in an end portion overlapping the flange of said adjacent side member, means for connecting the end portion of each bracket to its flange, and a vertical supporting screw threaded to the outer end of each side member for elevating the mold when rotated.

4. A mold comprising in combination horizontal side members arranged in rectangular end-to-side relation, connecting means on the inner end of each side member for adjusting the size of the mold, and a vertical supporting screw threaded to the outer end of each side member to change the vertical position of the mold, the end-to-side relation of the side members and the location of the supporting screws at the outer ends thereof providing a balanced four point supporting means for the mold regardless of the size thereof.

JAY B. DORMER.